W. J. FAUL.
LUBRICATOR.
APPLICATION FILED JUNE 11, 1904. RENEWED APR. 18, 1913.
1,078,268.
Patented Nov. 11, 1913.
2 SHEETS—SHEET 1.
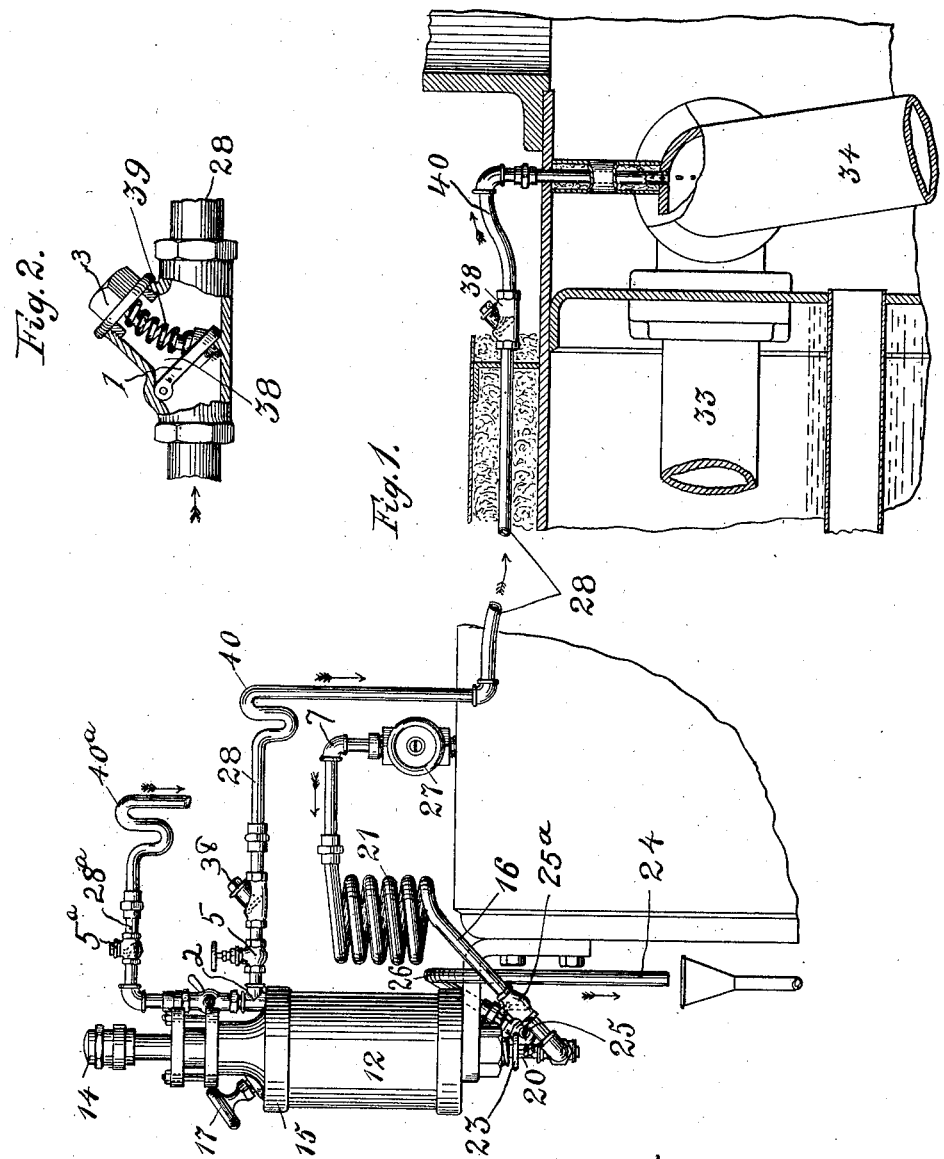

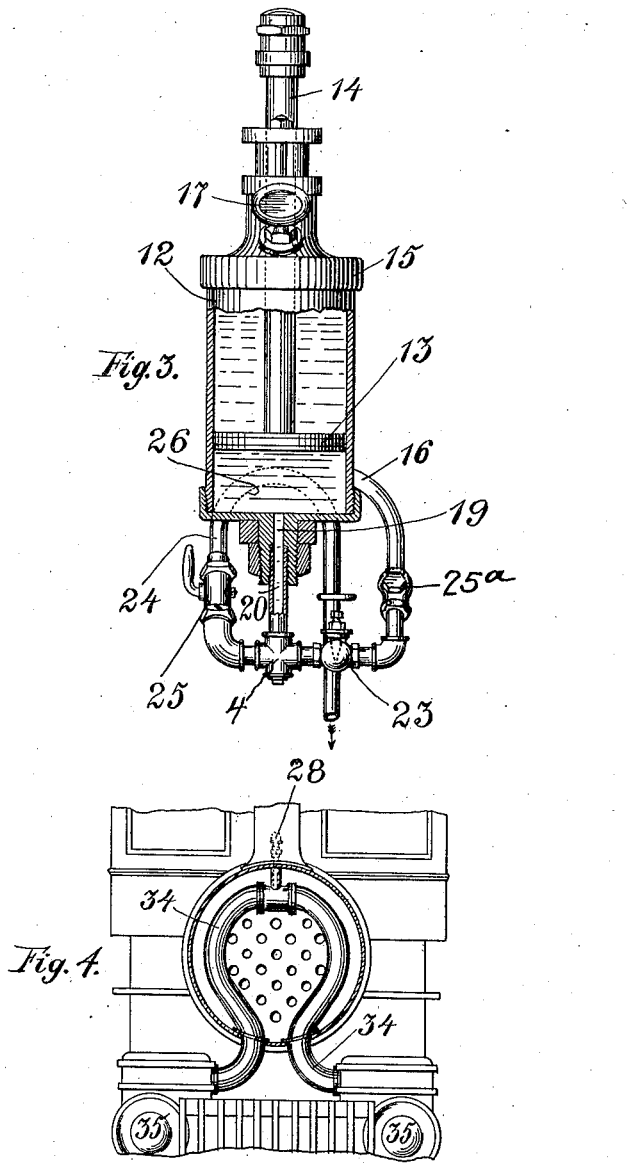

UNITED STATES PATENT OFFICE.

WILLIAM J. FAUL, OF NEW YORK, N. Y., ASSIGNOR TO WILLIAM J. FAUL CO., OF NEW YORK, N. Y., A CORPORATION OF NEW YORK.

LUBRICATOR.

1,078,268. Specification of Letters Patent. Patented Nov. 11, 1913.

Application filed June 11, 1904, Serial No. 212,182. Renewed April 18, 1913. Serial No. 762,095.

*To all whom it may concern:*

Be it known that I, WILLIAM J. FAUL, of the city, county, and State of New York, have invented certain new and useful Improvements in Lubricators, of which the following is a specification, reference being had to the accompanying drawings, wherein—

Figure 1 is a side elevation of a lubricator constructed according to my invention. Fig. 2 is a sectional view of one of the valves governing the flow of the lubricant. Fig. 3 is a vertical section partly in elevation of the oil feeding device. Fig. 4 is a detail sectional view of the front portion of a locomotive engine showing the feed pipe connecting with the so-called dry pipe of the engine.

This invention relates to lubricating devices for engines, particularly for locomotive engines and traction engines, wherein the lubricant for the working cylinders of the engines is delivered into the dry-pipe of the engine, located in the smoke box of the engine and immediately connecting with the working cylinders, and consists of the hereinafter more fully described construction of a lubricator for such engines and in devising the means, embodied in the structure of the lubricator, whereby fluctuations in the pressure of the steam in the dry-pipe and in the boiler are counteracted, so that a steady supply of the lubricant is fed into the working cylinders of the engine; the flow of the lubricant being maintained in uniform quantity and under a nearly constant pressure, regardless of the variations in the steam pressure in the boiler, actuating the feeding mechanism, and the pressure of the steam in the dry-pipe to which the lubricant is delivered.

The invention further consists of devising the means whereby the lubricant is delivered to the working cylinders of the engine continuously, while the engine is working, whether the fluid driving the engine (for instance, steam) is fed to the working cylinders or not.

The above described drawings illustrate a device, constructed according to my invention, applied to an ordinary railroad locomotive, or traction engine.

In the oil cup 12, of sufficient size and cylindrical in shape, and closed by lid 15, piston 13 is snugly fitted and its stem 14 is snugly fitted in a bore in lid 15. The bore in lid 15 may be packed or supplemented by a stuffing box. Another aperture, shown to be closed by plug 17, is provided in the lid 15 for filling the cup 12, above the piston 13, with oil or other lubricant. Fitting 2, also set in lid 15, serves for connecting thereto pipes 28 and 28$^a$ (and if required also other branches) for conducting the lubricant to such places as desired. In the arrangement, shown in the drawing, pipe 28 conveys the lubricant to the dry-pipe 34, from where the lubricant is drawn, with the steam, into the working cylinders of the engine, and pipe 28$^a$ to the pump, feeding the boiler. Check valves 5 and 5$^a$ are set in pipes 28 and 28$^a$ to regulate the flow of the lubricant. Trap bends 40 and 40$^a$ are provided to trap the oil against these valves. Pipe 20 screwed in the bottom of the oil cup 12 communicates through the port 19 with the interior of the cup, underneath the piston 13. Fitting 4, screwed on the end of pipe 20, connects on one side with the siphon pipe 24 and on the other with pipe 16 leading to condensing coil 21. This coil is in turn connected by pipe 7 with the interior of the boiler of the engine. Valve 27 is provided in this connection to admit (or shut off) steam from the boiler to the coil, whereas, valves 25, set in pipe 24, and 25$^a$, set in pipe 16, control the admission of the water from the coil 21 to, and its discharge from, the interior of the cup underneath piston 13. The pressure of the steam in the boiler acts upon the piston 13 to force the oil into the feed pipes 28 and 28$^a$ by its pressure upon the water driven into the oil cup 12 from the condensing coil 21. This water passes through pipe 20 in the space below the piston 13, and serves also to resist the downward motion of the piston at such moments when the pressure of the steam in the dry-pipe exceeds that of the steam in the boiler. To this end the return flow of the water from the oil cup 12 into coil 21 is retarded first at the port 19, whose cross-sectional area is very much smaller than that of the piston 13 and then again by the needle valve 23 set in pipe 16. These successive reductions in the cross-sectional area of the conduit between the oil cup 12 and the coil 21 divide the strain of the resistance and make the action of the device safely effective in preventing, in connection with the other devices described farther on, the driving of the oil from the feed pipes 28 and 28ª back into the cup, and thus effectively prevent the stopping of the feed whenever the driving force of the steam in the boiler is overcome by a momentary increase of the steam pressure in the dry-pipe above that in the boiler.

In place of the needle valve 23, other means for reducing the cross-sectional area of pipe 16, may be used. It is, however, preferable to use a needle valve for this purpose, because thereby the extent of the reduction may be controlled and the use of a needle valve also permits the shutting off of the connection with the coil 21 during the operation of re-filling the oil cup 12 with a fresh supply of lubricant. This is not essential, though advantageous. It is, however, necessary for the proper operation of the apparatus, that the cross-sectional area of the connection between pipe 20 and the coil 21 be reduced at some point.

Experience teaches, that a rigid regulating device is not capable of properly governing the flow of lubricant from a lubricating device actuated by an elastic fluid, such as steam, and that when only a rigid governing device is used, the oil is wasted whenever the pressure in the chamber, to which the oil is being delivered, is reduced below that of the steam in the boiler. And, again, if a back pressure valve alone be used to prevent such waste of the lubricant, no oil would be fed at all whenever the pressure in the steam chamber rises above that in the boiler, a condition occurring quite frequently in traction engines. Such frequent stopping of the lubricant would be very detrimental to the working parts of any engine, but particularly of a railroad or traction engine. Therefore, in constructing my improved lubricator, I combine with the devices described above, the valve shown in Fig. 2, one or more of such valves 38 being set in pipe 28, conveying the lubricant into the dry-pipe 34 (located in the smoke box of the engine and connecting with the steam chests of the working cylinders 35, as shown in detail in Fig. 4). These valves are constructed as shown in enlarged detail in Fig. 2. Each has a flap 1, hinged on a pin in a recess provided in the upper part of the valve chamber, and spring 39 is set to press the flap into its seat. Spring 39 thus acts upon the valve against the pressure of the oil flowing from the cup. It is not made long enough to hold flap 1 closed against the flow of the oil, but it does have a retarding effect on the flow of the oil and is of advantage in saving waste of the oil, when the pressure in the dry-pipe drops considerably below the pressure of the steam in the boiler. The valve and the interior of the valve casing are made accessible by unscrewing cover 3 to which one end of the spring 39 is secured to keep it in position. Valves 38, one or more of them as may be necessary to be set in pipe 28, are also instrumental in the maintaining of the feed of the lubricant and in preventing the driving back of the oil from pipe 28 into cup 12 when the pressure in the dry-pipe exceeds the pressure of the steam in the boiler. In this latter respect it acts as an ordinary flap or puppet valve, the traps 40 holding that part of pipe 28 between them and valves 38 constantly full of oil. This arrangement, together with the above described devices for resisting the downward motion of piston 13, prevents the stopping of the flow of the lubricant during such moments when the pressure in the dry-pipe exceeds the pressure of the steam in the boiler.

The aforedescribed devices are materially assisted in their action by the throttling of the passages for the fluid moving the piston as explained above. Lubricants are almost as incompressible as water, and when thus, by the throttling of the passages for the driving fluid underneath it, the piston is held against such "back" pressure, as might be exerted on it, when the pressure in the dry-pipe exceeds that in the boiler, the oil is held within the pipe 28 by the resistance of the fluid, driving the piston, against this "back" pressure from dry-pipe 34, and the pipe 28, being filled with oil forward and rearward of the valves 38, the pressure of the steam in the dry pipe upon the oil is, so to say, balanced thereby. Then the feed of the lubricant is not cut off as it would be if there were no means provided in the conduit for holding in the oil against such excessive pressure of the steam in the dry pipe and for the resisting the downward motion of the piston in the oil cup. And, equally, when the back pressure ceases, and when conditions are reversed, then the spring 39 acts in a sense as a resistance which the excessive pressure in the boiler must overcome before the flow of oil is increased. These conditions (unequal pressure) last only a moment at a time, and therefore, the spurting of lubricant is effectively prevented by the coöperation of these devices.

The operation of the lubricating device is as follows: To fill the lubricator the piston 13 is pressed as far down in the oil cup 12 as it will go, and the lubricant filled in into the space above the piston. Then the charging aperture is closed by plug 17, valve 25 is shut, valve 25ª in pipe 16 opened and the needle valve 23 adjusted. Then the steam control valve 27 is opened, slightly at first to admit steam to coil 21. Valve 27 is held open, and when the pointer on the indicator, connected with the oil cup (not described herein) begins to move, thus indicating the action of the steam pressure upon piston 13, the check valves 5 and 5ª are fully opened to fill rapidly the pipes 28 and 28ª, or either of them, with the lubricant, as may be required. Then the check valves 5 and 5ª are adjusted to pass only such quantity of the lubricant into pipes 28 (and 28ª) as is desired to be fed to the engine. When the apparatus is thus once adjusted it does not require any more attention as long as there is any lubricant left in the oil cup 12. When the supply of lubricant is exhausted, it is not necessary to shut off the valves 5 and 5ª to again refill the cup. To do so, plug 17 is first unscrewed and removed and then valve 25, connecting pipe 20 with the siphon pipe 24, is opened; then the piston 12 is pushed down as far as it will go. This pushing down of the piston forces out the water from the cup underneath it but does not empty pipe 20 and the part of pipe 24, connecting therewith, which remain filled to about the level of the bend 26 in pipe 24. The retaining of this water is effected by the upward turn and curve in pipe 24 and thus when valve 25ª is again opened, the water, remaining in pipe 20 is driven into the cup and prevents any air from entering into that space. The water is also retained in the part of pipe 16 between its joint with pipe 20 and valve 25ª. This condition is quite important in an apparatus constructed according to my invention, it being essential, as explained above, for the proper operation of the apparatus, that the fluid underneath the piston should be non-elastic, as only such fluid is capable of sustaining the piston in its position. When the lowest level of the piston 13 is reached, the lubricant is filled in the space of the cup above the piston, valve 25 is then turned again to close siphon pipe 24, plug 17 is replaced, and the lubricator is again in operation and adjusted as it was before.

I claim as my invention:—

1. A steam engine lubricator comprising the combination of an oil-cup, a piston fitted therein; a conduit from one end of the oil-cup into the steam chamber of the engine; a check valve in the conduit; a trap in the conduit between the valve and the steam chamber of the engine; a steam generator, a condenser, a conduit connecting it with the steam generator, a conduit connecting the condenser with the other end of the oil-cup, and means for reducing, at a point, the cross-sectional area of the conduit between the condenser and the oil-cup, substantially as herein shown and described.

2. A steam engine lubricator, comprising the combination of an oil-cup, a piston fitted therein; a conduit from the oil-cup into the steam chamber of the engine; a check valve and a trap in the conduit, the trap being located between the valve and the steam chamber of the engine, and means, operatively connected with the lubricator, for driving the lubricant from the oil-cup through the said conduit, substantially as herein shown and described.

3. A lubricator for feeding the lubricant into the steam chamber of an engine, comprising an oil-cup, a piston fitted therein and a conduit from one end of the oil-cup, above the piston, to the steam chamber; a check valve and an oil-trap in the conduit; a condenser and a conduit from the condenser to the other end of the oil-cup, underneath the piston; a device for reducing the cross-sectional area of the conduit at a point between the condenser and the oil-cup, and a conduit from the condenser to a supply of steam, substantially as herein shown and described, and for the purposes herein set forth.

4. A lubricator for feeding lubricant into the dry-pipe of a steam engine, the lubricator comprising an oil-cup, a piston fitted therein; a port in the oil-cup above the piston and a conduit for the lubricant from the port to the dry-pipe of the engine, a valve and an oil-trap in the conduit, a spring, set to press the valve against the flow of the lubricant; a port in the oil-cup underneath the piston; a condenser, a conduit from the port to the condenser, a needle valve, set in the conduit; and a conduit from the condenser to the steam boiler of the engine, substantially as herein shown and described, and for the purposes herein set forth.

5. A lubricator for continuously feeding lubricant into working cylinders of a steam engine, the lubricator comprising an oil-cup, a piston fitted therein, a port on one end of the oil-cup, a conduit from the port to the steam chamber, a check valve and an oil-trap in the conduit, the trap being located between a check valve and the delivery end of the conduit; a port on the other end of the oil-cup; a condenser and a conduit from the port to the condenser, a conduit from the condenser to the boiler of the engine, and of means for reducing, at a point, the cross-sectional area of the conduit from the port to the condenser; substantially as herein shown and described and for the purposes herein set forth.

WILLIAM J. FAUL.

Witnesses:
M. A. HELMKE,
JOHN A. PAULSON.